United States Patent [19]

Muranaka

[11] Patent Number: 5,297,762
[45] Date of Patent: Mar. 29, 1994

[54] OPTICAL NAVIGATION SENSOR WITH SINGLE TWO-DIMENSIONAL CCD

[75] Inventor: Noboru Muranaka, Tokyo, Japan

[73] Assignee: NEC Corporation, Tokyo, Japan

[21] Appl. No.: 935,160

[22] Filed: Aug. 26, 1992

[30] Foreign Application Priority Data

Aug. 26, 1991 [JP] Japan .................... 3-213869

[51] Int. Cl.$^5$ .................. B64G 1/66; G01S 3/78
[52] U.S. Cl. .................. 244/171; 250/203.3; 356/152; 356/935; 356/160
[58] Field of Search .......... 244/158 R, 171, 164; 250/203.1, 203.3; 356/141, 152, 145, 146; 364/451

[56] References Cited

U.S. PATENT DOCUMENTS

| | | | |
|---|---|---|---|
| 3,723,744 | 3/1973 | Lin et al. | 250/203.1 |
| 4,679,753 | 7/1987 | Landecker | 244/171 |
| 4,942,291 | 7/1990 | Dietrich | 250/203.3 |
| 4,952,809 | 8/1990 | McEwen | 250/203.3 |
| 4,999,483 | 3/1991 | Okamoto | 250/203.1 |
| 5,204,518 | 4/1993 | Lin et al. | 250/203.3 |
| 5,229,594 | 7/1993 | Vilaire et al. | 250/203.3 |

FOREIGN PATENT DOCUMENTS

2145597  3/1985  United Kingdom ............ 244/171

OTHER PUBLICATIONS

"Experimental Optical Navigation and Guidance for Muses-A", T. Nishimura et al, 39th Congress of the International Astronautical Federation–Oct. 8–15, 1988.

Primary Examiner—Galen L. Barefoot
Attorney, Agent, or Firm—Sughrue, Mion, Zinn, Macpeak & Seas

[57] ABSTRACT

In an optical navigation sensor used in a navigation system on a spinning spacecraft, a single CCD is positioned on an optical axis of an optical lens system at an image forming plane on which images of stars are formed by the lens system. The exposed surface of the CCD is divided into a first and a second region, the first region for dark images of stars, the second region for a bright image of a candidate planet. The second region of the CCD is implemented with a light shading film with a slit so that the second region is exposed by the bright image but with a light exposure reduced to an adequate level for the CCD. Alternatively, the second region may be provided with a light attenuation filter film. The CCD is driven by a single driver with a charge shift clock signal synchronous with the spinning rate of the spacecraft. The charges induced by the dark and bright images are time delayed and integrated to form an electronic signal of the images.

3 Claims, 3 Drawing Sheets

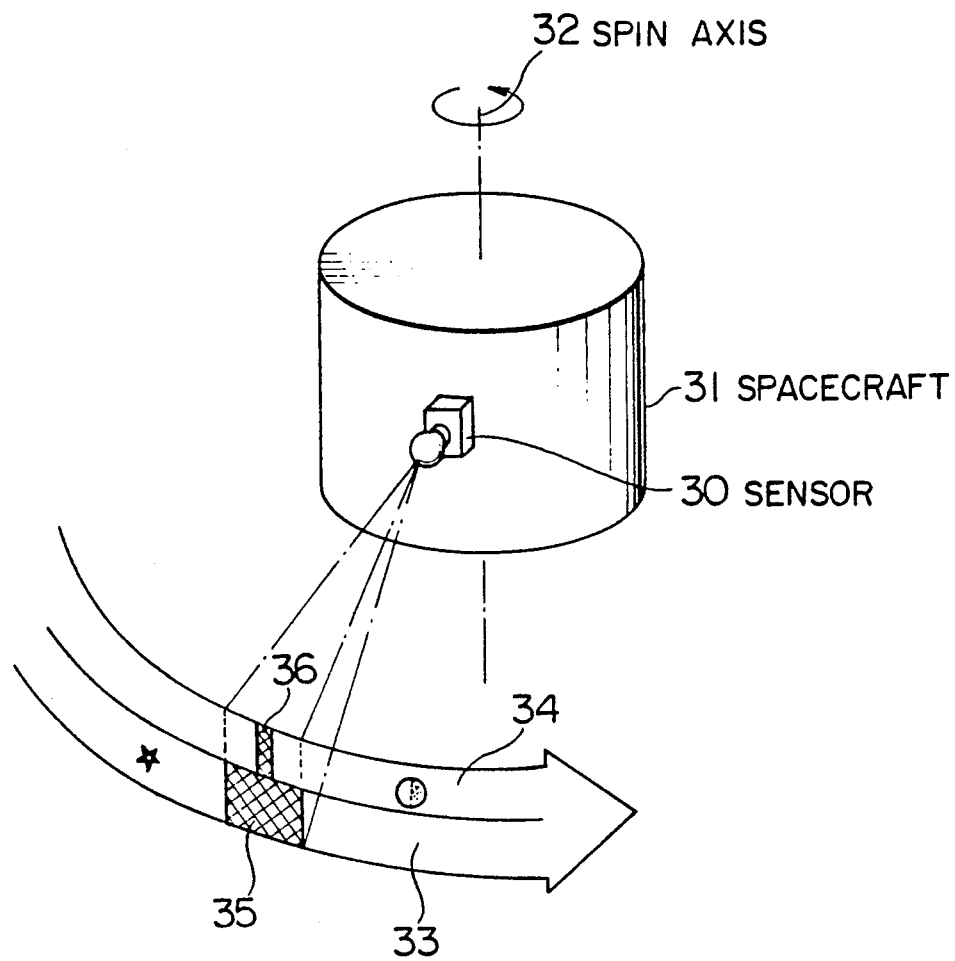
F I G. 4

OPTICAL NAVIGATION SENSOR WITH SINGLE TWO-DIMENSIONAL CCD

BACKGROUND OF THE INVENTION

The present invention relates to a navigation system on a spacecraft and, in particular, to an optical navigation sensor for use in such a navigation system.

The optical navigation sensor is used to take pictures of celestial objects such as the moon or a particular planet and particular two or more stars so as to obtain the information of the direction of the particular planet or the moon viewed from the spacecraft in an inertial space. The information obtained is used to improve the spacecraft's orbit determination accuracy.

In the paper entitled "EXPERIMENTAL OPTICAL NAVIGATION AND GUIDANCE FOR MUSES-A", 39th congress of the INTERNATIONAL ASTRONAUTICAL FEDERATION, Oct. 8-15, 1988, Bangalore, India, T. Nishimura et al disclose an optical navigation sensor which comprises a hood for preventing the sunlight from getting into an optics of the sensor, the optics for taking images of the moon and stars, and an electronics to convert the image data into serial digital signals.

The optics includes a Gaussian type lens system, two two-dimensional charge-coupled devices (CCDs) and a part of the electronics.

The two CCDs of the same type are assembled on a focal plane, one for the moon and the other for the star detection. As the moon is much brighter than stars, a light attenuation filter and a slit are implemented to reduce the moon's light to an adequate intensity level for the CCD.

The moon and star lights collected by the lens system are focused on the CCDs. Photo electrons are induced in each CCD pixel by the moon and star lights and are time-delayed and integrated (TDI) synchronously with the spacecraft spinning to prevent the images from smearing due to the images translation motion on the CCDs. The TDI clock (charge shift clock) can be tuned accurately to the spacecraft spin-rate from the ground.

One of the two CCDs' output signals is selected by an external command to the electronics. After a dark-current subtraction, image signals are A/D converted into digital signals and then stored into a memory. The data stored in the memory is reproduced and transmitted to the ground station.

To achieve the determination accuracy of the moon's direction viewed from the spacecraft in an inertial frame, the sensor also detects stars and determines the moon's direction by using the stars detected by the sensor itself as celestial references, and thus avoid the degradation in the accuracy due to the spacecraft wobble and the sensor misalignment with respect to the attitude sensors such as a spin type sun sensor, an earth sensor, and a star scanner.

In the known optical navigation sensor, since two CCDs are used for the moon and the stars, two CCD drivers must be used and a selection switch must be provided for selecting one of the two CCDs' outputs. This results in the electronics which is complex in structure, large in size and power consumption, and expensive in cost.

Further, two dimensional CCDs are positioned not on the optical axis but at both sides of the optical axis. Accordingly, the lens system is required to have a large aperture sufficient to make images on the two CCDs positioned adjacent to each other at the focal plane. Further, the lens system is required so that the images are made on the CCDs without distortion. This makes the lens system complex and large in structure, and expensive in cost.

SUMMARY OF THE INVENTION

It is an object of the present invention to provide an optical navigation sensor which is simple in structure, small in size and power consumption, and economical in cost.

In detail, the present invention attempts to use a single CCD for the bright star of the moon and the dim stars detection to thereby enable to use a simple lens system without suffer from image distortion and simplify the electronic circuit without use of a plurality of CCD drivers and any selection switch for selecting a plurality of CCDs.

According to the present invention, an optical navigation sensor for use in a navigation system on a spinning spacecraft is obtained which comprises: an optical lens system having an optical axis for taking light from celestial objects to produce images thereof at an image forming plane, each of the images moving in an image moving direction due to the spinning of the spacecraft; a hood for preventing the sunlight from getting into the optical lens system; and an electronic device for converting the images into an electric digital data signal. The electronic device comprises: a single two-dimensional charge-coupled device (CCD) positioned on the optical axis at the image forming plane and having an exposure surface with a matrix of pixels for producing photo electron charges induced by the images, the exposure surface of the CCD being previously divided into a first and a second region by a line in the image moving direction, the first region being for dark images of the dimmer stars of the celestial objects, the second region being for a bright image of a particular bright one of the celestial objects such as a particular planet or the moon and being implemented with means for reducing the light exposure by the bright object to an adequate level for the CCD; a CCD driving circuit coupled to the CCD for driving the CCD to shift the charges from one to the adjacent one of the pixels in the image moving direction by a charge shift clock signal synchronous with the spinning of the spacecraft so as to time-delay and integrate the charges to thereby produce an electric signal of the dark and bright images; and a signal processing circuit coupled to the CCD for processing the electric signal to produce the electric digital data signal.

The light exposure reducing means may be a light shading film coated on the second region, the light shading film having a predetermined slit for permitting the light of the bright image to partially expose the second region of the exposure surface.

The light exposure reducing means may also be a light attenuation filter film coated over the second region of the exposure surface.

BRIEF DESCRIPTION OF THE DRAWINGS

FIG. 4 is a perspective view schematically illustrating the optical navigation sensor of FIG. 1 viewing the moon and stars from the spinning spacecraft.

DESCRIPTION OF PREFERRED EMBODIMENTS

Figure 1:
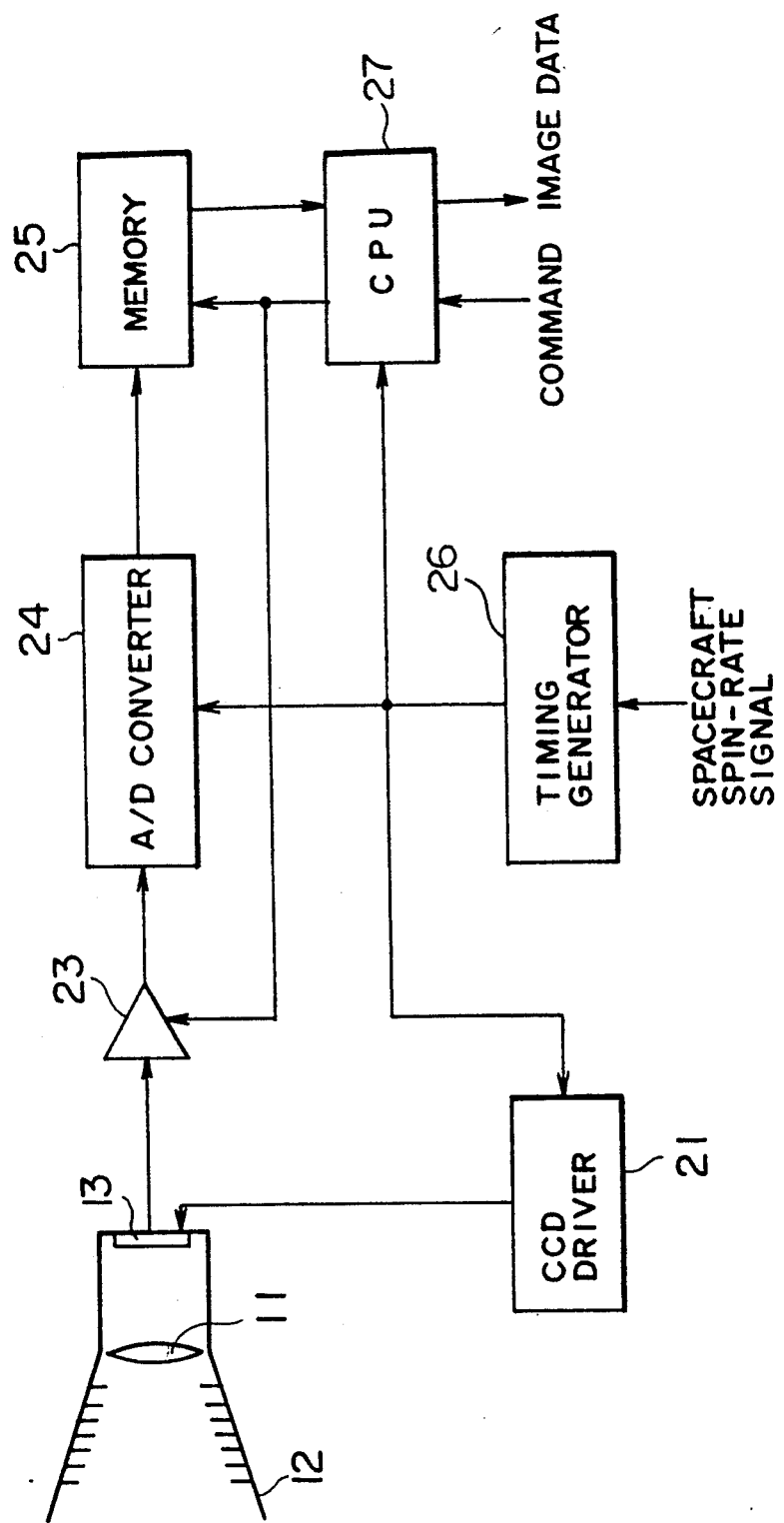
FIG. 1 is a block diagram view of an optical navigation sensor according to one embodiment of the present invention.

Referring to FIG. 1, the optical navigation sensor according to one embodiment of the present invention is used on a spinning spacecraft as shown at 31 in FIG. 4. The optical navigation sensor comprises an optical lens system 11 having an optical axis for taking light from stars to produce images thereof at an image forming plane or a focal plane. Each of the images moves on the image forming plane in an image moving direction due to the spinning of the spacecraft. A hood 12 is for preventing the sunlight from getting into the optical lens system 11.

An electronic device is for converting the images into an electric digital data signal. The electronic device comprises a single two-dimensional charge-coupled device (CCD) 13 positioned on the optical axis at the image forming plane.

Figure 2:
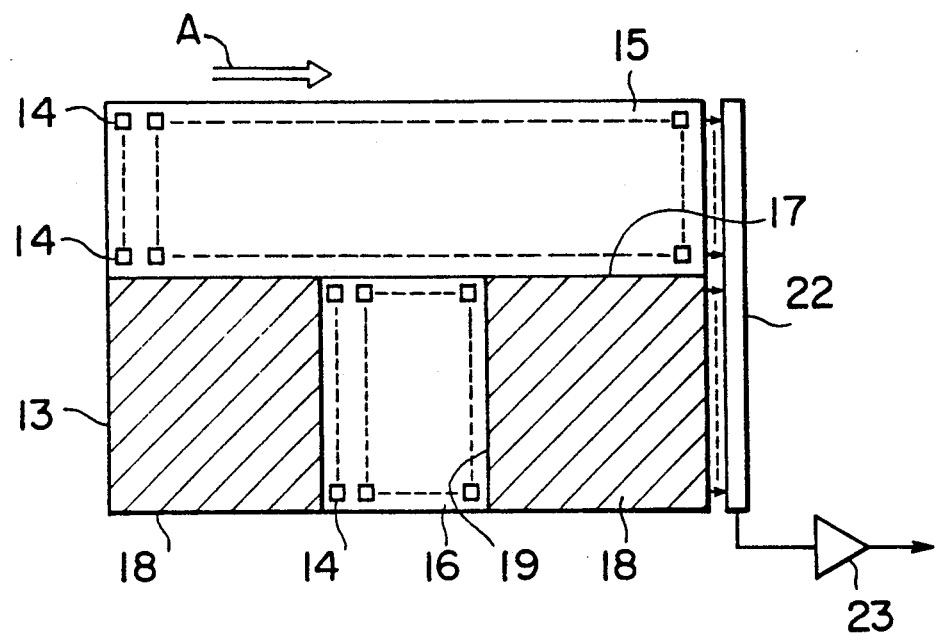
FIG. 2 is a plan view of an example of a CCD used in the optical navigation sensor of FIG. 1.

Referring to FIG. 2, the CCD 13 is, for example, an interline type and has an exposed surface with a matrix of pixels 14 for producing photo electron charges induced by the images formed on the exposed surfaces of the CCD 13. The exposed surface of the CCD 13 is previously divided into a first and a second region 15 and 16 by a line 17 in the image moving direction shown by an arrow A. The first region 15 is for dark, obscure, or weak light images of stars. The second region 16 is for a bright image of a particular bright one of the stars such as a particular planet or the moon and is implemented with means for reducing the light exposure by the bright object to an adequate level for the CCD 13.

In FIG. 2, an example of the light exposure reducing means can be a light shading film 18 coated on the second region 16. The light shading film 18 has a predetermined slit 19 for permitting the light of the bright image to partially expose the second region 16 of the exposure surface of the CCD 13. Since the second region 16 is partially exposed only through the slit 19 by the bright image, the resultant exposure is reduced to the adequate value of the CCD 13. The light shading film 18 is, for example, an aluminum film of a thickness of several micron meters plated on the second region. The shading film 18 may be mounted or supported on the CCD 13 by any supporting member over the second region.

Figure 3:
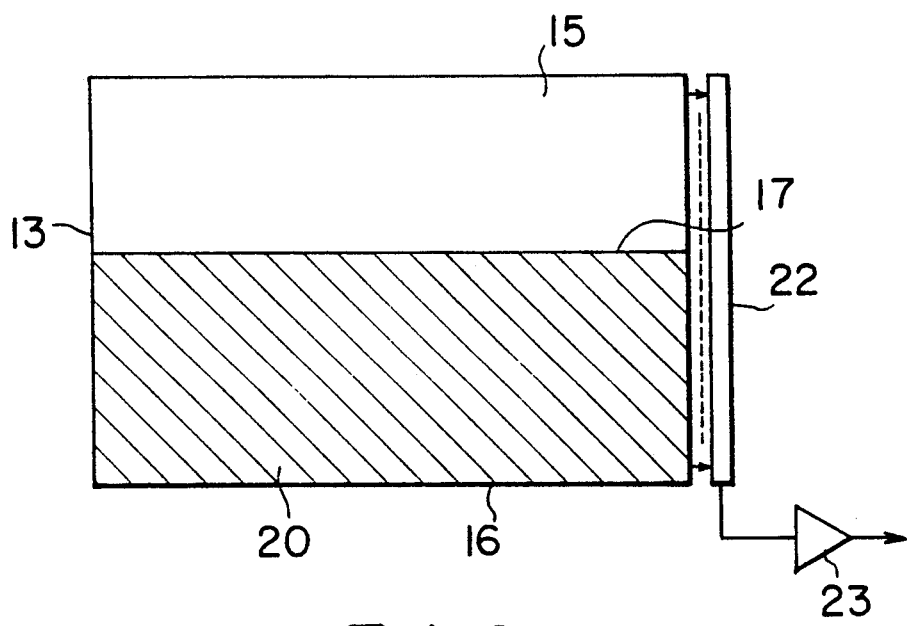
FIG. 3 is a plan view of another example of the CCD.

Referring to FIG. 3, the light exposure reducing means may also be a light attenuation filter film 20 coated over the second region 16 of the exposure surface of the CCD 13. Since the intensity of the bright image is weakened by the filter film 20 so that the resultant exposure is reduced to the adequate value of the CCD 13. The light attenuation filter film 20 is, for example, an aluminum film of a thickness of 1 micron meter plated on the second region. The light attenuation filter film 20 may be mounted or supported on the CCD 13 by any supporting member over the second region.

Returning to FIG. 1, a CCD driving circuit 21 is coupled to the CCD 13 for driving the CCD 13 to shift the charges from one to the adjacent one of the pixels 14 in the image moving direction A (in FIG. 2) by a charge shift clock signal or a timing signal synchronous with the spinning of the spacecraft. So that the charges are time-delayed and integrated. The integrated charges are eventually shifted as signals of all of picture elements in a direction perpendicular to the A direction into a multi-state shift register 22.

Now, the A direction and the perpendicular direction are referred to as the horizontal and the vertical directions, respectively. Then, the signals of all of picture elements in the vertical direction forms an image signal on the vertical scanning line. The image signal is serially delivered to an amplifier 23 before applying the next charge shift clock. Thus, a plurality of image signals are serially delivered to the amplifier 23 as an electric signal of the dark and bright images.

An analog-digital converting circuit (A/D converter) 24 converts the electric signal synchronously with a timing signal into a digital signal as an electric digital data signal which is stored in a memory 25.

A timing generator 26 is supplied with, as a spacecraft spin-rate signal, a sun pulse signal from the spin type sun sensor (not shown) and produces the timing signal synchronous with the spacecraft spin rate. The timing signal is supplied to the CCD driver 21 as the charge shift clock, the A/D converter 24, and a central processor unit (CPU) 27.

The CPU 27 receives the timing signal from the timing generator 26 and various commands from the earth station and controls the optical navigation sensor.

The CPU 27 at first starts the sensor in response to a start command for collecting image data from the earth station.

The CPU 27 selects, as a selected data signal, ones from outputs of the CCD 13 corresponding to the region identified by a selection command from the earth station and to store the selected data signal into the memory 25 as a part of stored data. That is, the CPU 27 controls the amplifier 23 to select a part of the electric image signal from the CCD 13 in response to the selection command by the dark-current substraction or the reduction of null image signal portion. The CPU 27 controls the memory 25 to store the selected data signal as a part of the data signal stored in the memory 25.

Then, the CPU 27 reads, as read data, the stored data signal in response to a reading command from the earth station and to transmit the read data signal, as image data, to a communication system on the spacecraft.

The CPU 27 repeats the operation described above in the commands from the earth station.

Referring to FIG. 4, the sensor 30 of the present invention is mounted on the spinning spacecraft 31 so that the optical axis of the sensor 30 is set in perpendicular to the spin axis 32 of the spacecraft 31. Accordingly, the optical axis is in the plane perpendicular to the spin axis 32. Since the sensor 30 rotates about the spin axis 32 together with the spacecraft 30, the sensor 30 scans the celestial zone one time per one spin or revolution of the spacecraft 30. In detail, two parallel first and second celestial regions 33 and 34 in the celestial zone are scanned corresponding to the first and the second regions 15 and 16 on the CCD 13 of the sensor 30, respectively. In FIG. 4, a cross-hatched large area 35 is an instantaneous field of view corresponding to the first region 15 of the CCD 13. A cross-hatched small area 36 is an instantaneous field of view corresponding to the slit 19 on the second region 16 of the CCD 13.

For optical navigation and guidance, the spin axis 32 of the spacecraft 31 is adjusted by thrusters (not shown) under control of an attitude and orbit control system (not shown) so that a candidate bright object such as a particular planet or the moon is in the second celestial region 34 while several candidate stars are in the first celestial region 33.

Thus, the bright image of the candidate bright planet or the moon is projected on the second region 16 on the CCD 13 and the dark images of the candidate stars are projected on the first region 15 on the CCD 13. An electric signal of those images is amplified at the amplifier 23 and is converted into a digital signal at the A/D converter 24, then stored in the memory 25. Thus, the data for optical navigation can be collected by the sensor 30.

What is claimed is:

1. An optical navigation sensor for use in a navigation system on a spinning spacecraft, which comprises:

an optical lens system having an optical axis for taking light from celestial objects to produce images thereof at an image forming plane, each of said images moving in an image moving direction due to the spinning of said spacecraft;

a hood for preventing the sunlight from getting into said optical lens system; and an electronic device for converting said images into an electric digital data signal;

said electronic device comprising:

a single two-dimensional charge-coupled device (CCD) positioned on said optical axis at said image forming plane and having an exposure surface with a matrix of pixels for producing photo electron charges induced by said images, the exposure surface of said CCD being previously divided into a first and a second region by a line in said image moving direction, said first region being for dark images of dark stars of said celestial objects, said second region being for a bright images of a particular bright one of said celestial objects such as a particular planet or the moon and being implemented with means for reducing the light exposure by the bright object to an adequate level for said CCD;

a CCD driving circuit coupled to said CCD for driving said CCD to shift said charges from one to the adjacent one of said pixels in the image moving direction by a charge shift clock signal synchronous with the spinning of the spacecraft so as to time-delay and integrate said charges to thereby produce an electric signal of said dark and bright images; and a signal processing circuit coupled to said CCD for processing said electric signal to produce said electric digital data signal.

2. An optical navigation sensor as claimed in claim 1, wherein said light exposure reducing means is a light shading film coated on said second region, said light shading film having a predetermined slit for permitting the light of the bright image to partially expose said second region of the exposure surface.

3. An optical navigation sensor as claimed in claim 1, wherein said light exposure reducing means is a light attenuation filter film coated over said second region of the exposure surface.

* * * * *